United States Patent
Salamon et al.

(10) Patent No.: US 10,162,542 B1
(45) Date of Patent: Dec. 25, 2018

(54) DATA PROTECTION AND INCREMENTAL PROCESSING FOR MULTI-SPAN BUSINESS APPLICATIONS

(71) Applicant: EMC IP HOLDING COMPANY LLC, Hopkinton, MA (US)

(72) Inventors: Victor Salamon, Edmonton (CA); Thomas Polasek, Edmonton (CA); Tsung Lin Yong, Edmonton (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 143 days.

(21) Appl. No.: 15/491,407

(22) Filed: Apr. 19, 2017

(51) Int. Cl.
- G06F 12/00 (2006.01)
- G06F 13/00 (2006.01)
- G06F 3/06 (2006.01)
- G06F 13/24 (2006.01)
- G06F 13/42 (2006.01)
- G06F 13/40 (2006.01)

(52) U.S. Cl.
CPC .......... G06F 3/0619 (2013.01); G06F 3/065 (2013.01); G06F 3/067 (2013.01); G06F 3/0659 (2013.01); G06F 3/0661 (2013.01); G06F 13/24 (2013.01); G06F 13/4068 (2013.01); G06F 13/42 (2013.01)

(58) Field of Classification Search
None
See application file for complete search history.

(56) References Cited

U.S. PATENT DOCUMENTS

| | | | |
|---|---|---|---|
| 9,645,899 B1 * | 5/2017 | Felstaine | G06F 11/2002 |
| 2005/0005200 A1 * | 1/2005 | Matena | G06F 9/5072 714/38.13 |
| 2009/0171732 A1 * | 7/2009 | Bobak | G06Q 10/0633 705/7.13 |
| 2010/0229047 A1 * | 9/2010 | Mikami | G06F 11/324 714/46 |
| 2011/0116362 A1 * | 5/2011 | Singatwaria | H04J 3/14 370/216 |
| 2015/0088826 A1 * | 3/2015 | Song | G06F 17/30082 707/634 |
| 2015/0180730 A1 * | 6/2015 | Felstaine | H04L 41/022 709/225 |
| 2017/0171276 A1 * | 6/2017 | Liu | H04L 65/602 |
| 2017/0364425 A1 * | 12/2017 | Haid | G06F 9/45558 |
| 2018/0074907 A1 * | 3/2018 | Warnes | G06F 11/1441 |
| 2018/0089044 A1 * | 3/2018 | Guim Bernat | G06F 11/2069 |

* cited by examiner

Primary Examiner — Sean D Rossiter
(74) Attorney, Agent, or Firm — Anderson Gorecki LLP

(57) ABSTRACT

A protection orchestrator manages creation of temporally consistent protection points for a multi-span business application. Each multi-span protection point includes component protection points generated by nodes such as host computers, storage arrays, version control repositories and cloud storage gateways. Shim programs running on the nodes translate commands from the protection orchestrator into protocol commands for the node with which they are associated. A first command pauses changes to all components of the multi-span business application. A second command causes creation of the component protection points. A third command un-pauses the changes to the components.

20 Claims, 6 Drawing Sheets

DATA PROTECTION AND INCREMENTAL PROCESSING FOR MULTI-SPAN BUSINESS APPLICATIONS

BACKGROUND

The subject matter of this disclosure is generally related to multi-span business applications. A multi-span business application includes a variety of different component programs that function together in an integrated manner. Individual component programs perform tasks that may include but are not limited to management of sales, accounting, engineering production, inventory, personnel, buildings, and documents. An integration layer with program code enables the different component programs to exchange data, requests and commands. Examples of multi-span business applications may include but are not limited to SAP, OAP and Amdocs. A multi-span business application may be supported by data centers with clusters of host servers, storage arrays and other devices. The host servers run the component programs. Component program data may be maintained on tangible persistent data storage drives that are managed by the storage arrays.

SUMMARY

All examples, aspects and features mentioned in this document can be combined in any technically possible way.

In accordance with an aspect, an apparatus comprises: a storage array comprising: a plurality of interconnected computing nodes, each of the computing nodes comprising at least one processor and non-transitory volatile memory; a plurality of groups of non-volatile data storage drives, each group of data storage drives connected with one of the computing nodes; a plurality of host computers, each host computer running at least one component program of a plurality of component programs that comprise a multi-span business application, component program data being stored on the storage array; and a protection orchestrator comprising instructions stored on non-transitory computer-readable memory that: causes changes to the component programs and the data to pause; causes creation of temporally consistent component protection points for the component programs and the data; and causes changes to the component programs and the data to un-pause after creating the temporally consistent component protection points. Some implementations comprise a first shim program running on a first one of the host computers, the first shim program translating a first command to create a component protection point into a first protocol message that is supported by the first host computer. Some implementations comprise a second shim program running on a second one of the host computers, the second shim program translating the first command into a second protocol message that is supported by the second host computer, the first protocol message being different than the first protocol message. Some implementations comprise a third shim program running on a storage array, the third shim program translating the first command into a third protocol message that is supported by the storage array, the first, second and third protocol messages being different from each other. Some implementations comprise a fourth shim program running on a version control repository, the fourth shim program translating the first command into a fourth protocol message that is supported by the version control repository, the first, second, third and fourth protocol messages being different from each other. In some implementations each of the component protection points is a snap. In some implementations each of the component protection points is a clone. In some implementations each of the component protection points is a backup. In some implementations each of the component protection points is an incremental backup. Some implementations comprise a data replication appliance on which the protection orchestrator runs.

In accordance with an aspect a method comprises: in a network comprising: a storage array comprising: a plurality of interconnected computing nodes, each of the computing nodes comprising at least one processor and non-transitory volatile memory; a plurality of groups of non-volatile data storage drives, each group of data storage drives connected with one of the computing nodes; and a plurality of host computers, each host computer running at least one component program of a plurality of component programs that comprise a multi-span business application, component program data being stored on the storage array; pausing changes to the component programs and the data; creating temporally consistent component protection points for the component programs and the data; and un-pausing changes to the component programs and the data after creating the temporally consistent component protection points. Some implementations comprise running a first shim program on a first one of the host computers, the first shim program translating a first command to create a component protection point into a first protocol message that is supported by the first host computer. Some implementations comprise running a second shim program on a second one of the host computers, the second shim program translating the first command into a second protocol message that is supported by the second host computer, the first protocol message being different than the first protocol message. Some implementations comprise running a third shim program on a storage array, the third shim program translating the first command into a third protocol message that is supported by the storage array, the first, second and third protocol messages being different from each other. Some implementations comprise running a fourth shim program on a version control repository, the fourth shim program translating the first command into a fourth protocol message that is supported by the version control repository, the first, second, third and fourth protocol messages being different from each other. In some implementations creating temporally consistent component protection points comprises creating snaps. In some implementations creating temporally consistent component protection points comprises creating clones. In some implementations creating temporally consistent component protection points comprises creating backups. In some implementations creating temporally consistent component protection points comprises creating incremental backups. Some implementations comprise sending the command from a protection orchestrator running on a data replication appliance.

Other aspects, features and implementations may become apparent in view of the detailed description and figures.

DETAILED DESCRIPTION

Figure 1:
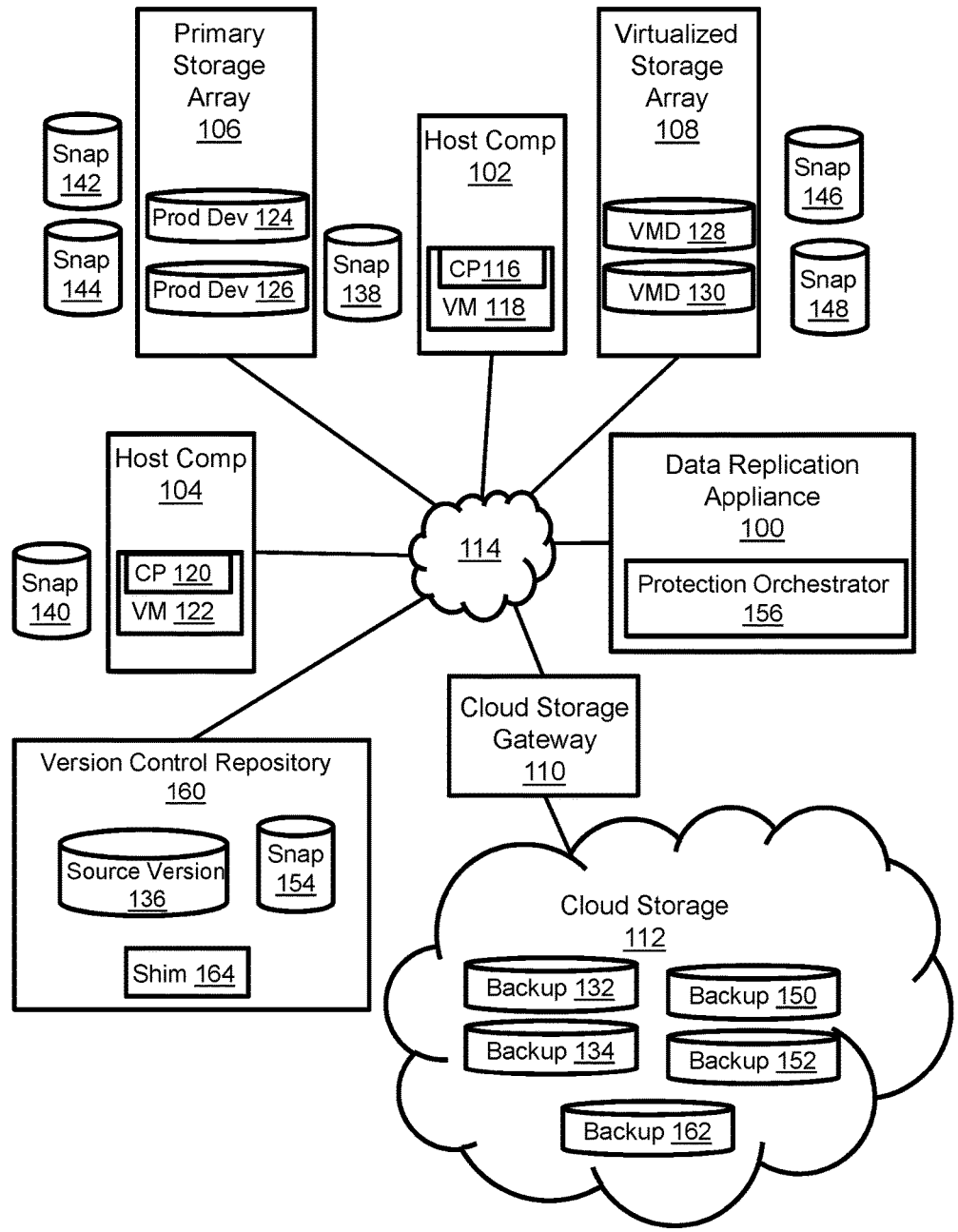
FIG. 1 illustrates a simplified computer network in which consistent protection points for a multi-span business application are generated, maintained and used for restoration.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible non-transitory features. For example, a virtual storage device could be based on multiple physical storage drives. The term "logic" is used to refer to special purpose physical circuit elements and software instructions that are stored on a non-transitory computer-readable medium and implemented by general-purpose tangible processors.

A multi-span business application includes a variety of different component programs at various levels of the application stack. The component programs work together in an integrated manner. Individual component programs may perform specific tasks that possibly include but are not limited to management of sales, accounting, engineering production, inventory, personnel, buildings, and documents. Different component programs typically run on different network nodes, perform different functions, support different protocols, and may be located at geographically diverse sites. Further, each component program may use a distinct data set and be native to any of a variety of OSs (operating systems). An integration layer with program code enables the different component programs to exchange data, requests and commands. Component program data may be stored on storage arrays and cloud storage.

Storage arrays can provide a variety of data storage services including but not limited to data backup and data replication. Data backup helps to avoid data loss. Data replication helps to assure data availability. Data backup may be implemented by periodically copying data from a storage array to relatively low performance storage resources. For example, the storage array may use high performance SSDs (solid state devices) such as flash drives whereas a backup site for that storage array may use less costly low performance spinning disk media or tape drives. The backup site may be at a different geographical location from the production site in order to reduce the likelihood of destruction of both systems in the event of a disaster. Backups may be performed relatively infrequently in order to avoid degradation of the performance of the production site being backed up. For example and without limitation, backups may be performed daily or weekly. As a result, the backup copy is not synchronized with the production site data being backed up. Backups are useful for disaster recovery because the backup copy is likely to survive a disaster that destroys the production site. However, a disaster recovery operation from a backup copy interrupts host applications, may require considerable down time and is not transparent to the users. In contrast with data backup, data replication facilitates data availability by helping to provide failover capability. Data availability is sometimes quantified as the percentage of time that a host application is working and the host data is accessible. Data availability may be provided by maintaining a failover data storage system that has the same performance capabilities as a primary data storage system. For example, a production site storage array with a given TOPS (input-output operations per second) capability may be paired with an identical failover site storage array with the same TOPS capability. A replica such as a snap or clone of the data set on the production site storage array is maintained on the failover site storage array. A snap is a consistent point-in-time copy of a storage object in persistent storage. Multiple snaps may be generated over time. Each snap may be an incremental copy that only represents changes to the storage object since some prior point in time, e.g. and without limitation since creation of the previous snap. A snap that is a complete copy of the source object at some point in time may be referred to as a clone. Clones may be created to provide prior point in time versions of the storage object where the storage object is updated with each change. Changes to the data set are implemented on both the production site storage array and the failover site storage array. For example, changes may be synchronously written to the production site storage array and backup site storage array. Synchronous writes enable the replica to be synchronized with the production site data set being replicated. In a failover situation the failover site storage array will quickly take over for the production site storage array by using the replica. The failover can potentially be transparent to the users, e.g. without interrupting host applications and without a noticeable loss of performance, because the recovery time provided by a failover site storage array with a replica is much faster than retrieval of backup data and disaster recovery procedures. However, maintaining redundant high performance storage arrays increases equipment and service costs. Regardless of the distinctions, backups, snaps and clones are each examples of protection points.

FIG. 1 illustrates a simplified computer network in which temporally consistent protection points for a multi-span business application are generated. Network nodes in the illustrated example include a data replication appliance 100, host computers 102, 104, primary storage array 106, virtualized storage array 108, a cloud storage gateway 110, cloud storage 112, and a VCR (version control repository) 160. The nodes are interconnected by a network 114. A typical implementation might include more nodes than can practically be illustrated, e.g. clusters of host computers in data centers with a variety of switches, routers and storage equipment, etc. The multi-span business application includes component program 116 running on a VM (virtual machine) 118 on host computer 102, and component program 120 running on a VM 122 on host computer 104. The component programs are also known as host applications. Component program data for component program 116 is maintained on production device 124 by primary storage array 106. Component program data for component program 120 is maintained on production device 126 by primary storage array 106. A virtualized managed drive 128 is associated with production device 124 and maintained by storage array 108. A virtualized managed drive 130 is associated with production device 126 and is maintained by storage array 108. Cloud storage 112 maintains backups 132, 134, 150, 152. A source version 136 in the source control repository 160 includes component program code and configurations.

A protection orchestrator 156 running on the data replication appliance 100 is responsible for managing generation of consistent protection points for the multi-span business application. Each node is capable of generating component protection points for storable information related to the multi-span business application that is maintained by that node. Although snaps will be described as the protection points in the examples below it should be understood that any of a wide variety of protection points could be implemented. In the illustrated example host computer 102 can generate a snap 138 of component program 116 and virtual machine 118 configuration and state information. Host computer 104 can generate a snap 140 of component program 120 and virtual machine 122 configuration and state information. Primary storage array 106 can generate a snap 142 of production device 124, and a snap 144 of production device 126. Virtualized storage array 108 can generate a snap 146 of device 128, and a snap 148 of device 130. Version control repository 160 can generate a snap 154 of source version 136. The set of component snaps 138, 140, 142, 144, 146, 148, 154 represents a snap of the multi-span business application, provided that the component snaps are temporally consistent. The protection orchestrator manages generation of temporally consistent component protection point snaps by halting changes to multi-span business application data, code and information, prompting generation of the component protection point snaps while changes to the multi-span business application data, code and information are halted, and prompting resumption of operations that change multi-span business application data, code and information after all of the component protection point snaps have been generated. The multi-span business application data may include component program data, component program code, virtual machine and component program configuration and state, operating systems, and any other storable information that is required to operate the multi-span business application. Thus, the component protection point snaps are a consistent point-in-time representation of the information required to restore the multi-span business application.

In another example the protection orchestrator 156 could manage generation of temporally consistent backups. Backup 132 is a backup of production device 124, including data on virtualized managed drive 128. Backup 134 is a backup of production device 126, including data on virtualized managed drive 130. Backup 150 is a backup of VM 118, e.g. including one or more of configuration, state, OS, and the component program. Backup 152 is a backup of VM 122. Backup 162 is a backup of source version 136. The protection orchestrator manages generation of temporally consistent component protection point backups by halting changes to multi-span business application data, code and information, prompting generation of the component protection point backups 132, 134, 150, 152, 162 while changes to the multi-span business application data, code and information are halted, and prompting resumption of operations that change multi-span business application data, code and information after all of the component protection point backups have been generated.

Figure 2:
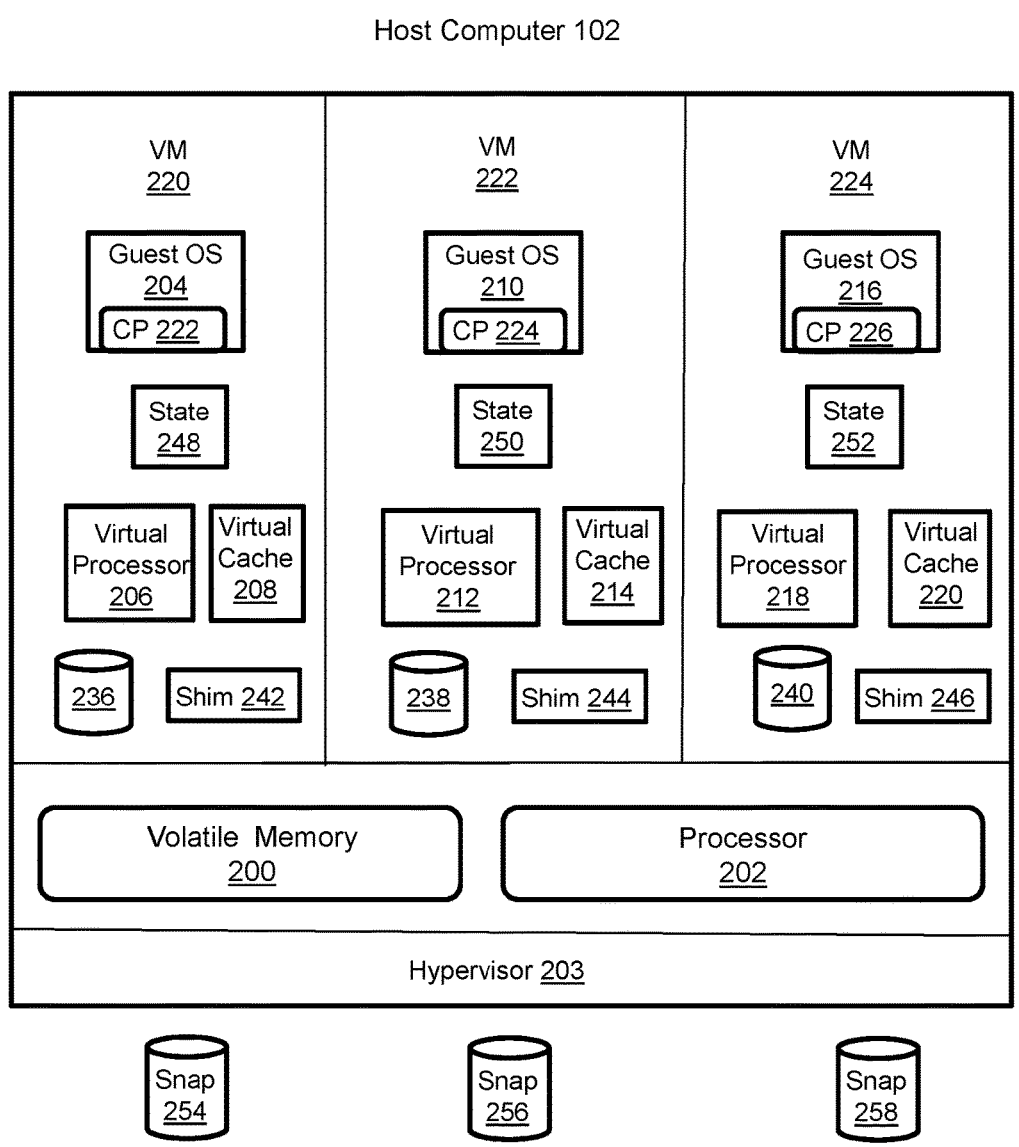
FIG. 2 illustrates the host computer in greater detail.

FIG. 2 illustrates the host computer 102 in greater detail. The illustrated host computer includes volatile memory 200 and processor 202. The volatile memory 200 may include, for example and without limitation, memory chips such as RAM (random access memory) components. The processor 202 may include, for example and without limitation, multi-core CPUs and GPUs on one or more IC (integrated circuit) chips. The hypervisor 203 allocates portions of the volatile memory and processor to the VMs 220, 222, 224. For example and without limitation, memory and processing resources may be allocated and shared on the basis of ranges of memory addresses, time-multiplexed CPU cycles and CPU threads. In the illustrated example the hypervisor 203 allocates virtual processor 206 and virtual cache 208 to VM 220, virtual processor 212 and virtual cache 214 to VM 222, and virtual processor 218 and virtual cache 220 to VM 224. An OS-container architecture could be used in place of the hypervisor-VM architecture so no distinction is intended by describing a hypervisor and VMs. Respective guest OSs 204, 210, 216 running in the VMs use the allocated resources. For example, guest OS 204 uses virtual processor 206, virtual cache 208 and logical storage device 236, guest OS 210 uses virtual processor 212, virtual cache 214 and logical storage device 238, and guest OS 226 uses virtual processor 218, virtual cache 220 and logical storage device 240. Each guest OS is unaware of the existence of other guest OSs and resources beyond its VM. Instances of component programs 222, 224, 226 run on the guest OSs. Each component program instance is a part of the multi-span business application.

In order to enable the protection orchestrator 156 (FIG. 1) to manage generation of snap 138 (FIG. 1) consistently along with the other component snaps each VM 220, 222, 224 has installed thereon a separate shim program 242, 244, 246, respectively. Each shim program translates commands, requests, acknowledgements and replies between a first protocol that is used by the protection orchestrator and a second protocol that is used by the VM. For example, shim 242 for VM 220 translates a command from the protection orchestrator into a command to the VM which requests creation of snapshot 254. Different VMs may support different protocols so shim programs 242, 244, 246 may each support different protocols. Each VM may also maintain respective configuration and state information 248, 250, 252. Snap 254 may include one or more of configuration and state information 248, component program 222, guest OS 204, and data in logical storage device 236. Snap 256 may include one or more of configuration and state information 250, component program 224, guest OS 210, and data in logical storage device 238. Snap 258 may include one or more of configuration and state information 252, component program 226, guest OS 216, and data in logical storage device 240. Snap 254, snap 256 and snap 258 may be aggregated as the host computer snap 138 (FIG. 1).

Figure 3:
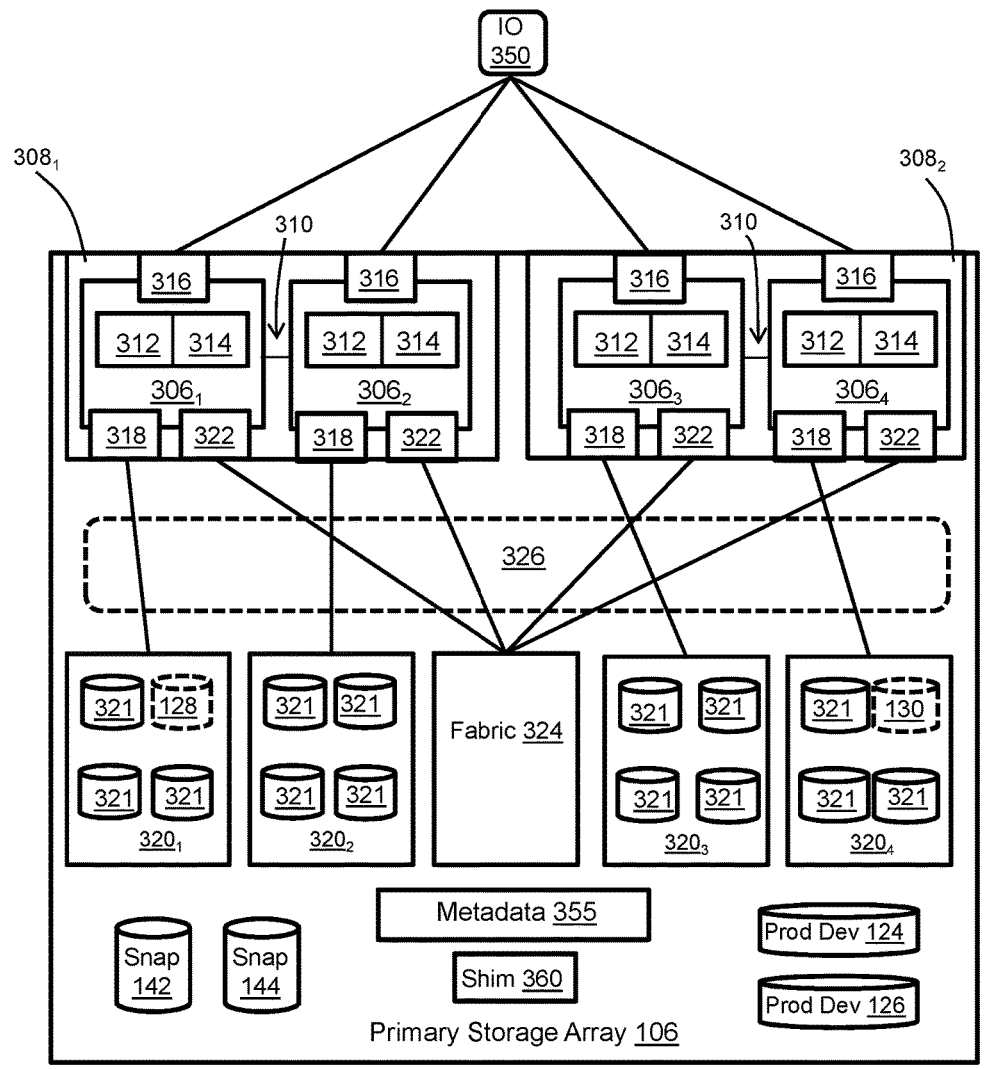
FIG. 3 illustrates the primary storage array in greater detail.

FIG. 3 illustrates primary storage array 106 in greater detail. The architecture and components of the illustrated primary storage array are specifically designed for providing data storage services. However, the illustrated example is merely provided for context and the primary storage array, data backup storage array, and storage virtualization storage arrays could be implemented in a wide variety of different ways. In the specifically illustrated example the primary storage array 106 includes a plurality of computing nodes $306_1$-$306_4$ such as storage directors, for example and without limitation. Pairs of the computing nodes, e.g. ($306_1$, $306_2$) and ($306_3$, $306_4$), may be organized as storage engines $308_1$, $308_2$, respectively, for purposes of failover between computing nodes. The paired computing nodes of each storage engine may be directly interconnected by communication links 310. Each computing node includes at least one tangible multi-core processor 312 and a local (volatile memory) cache 314. The local cache 314 may include, for example and without limitation, volatile memory components such as RAM (random access memory). Each computing node may include one or more FEs 316 (front-end directors, a.k.a. front end adapters) for communicating with the host computers 106, 114. Each computing node $306_1$-$306_4$ may also include one or more BEs 318 (back end directors, a.k.a. back end adapters) for communicating with respective associated back end storage bays $320_1$-$320_4$, thereby enabling access to managed drives 321. The managed drives 321 include tangible non-volatile storage components of one or more technology types, for example and without limitation SSDs such as flash, and HDDs (hard disk drives) such as SAS (Serial Attached SCSI) HDDs, SATA (Serial Advanced Technology Attachment) and FC (Fibre Channel). Each computing node may also include one or more CAs (channel directors, a.k.a. channel adapters) 322 for communicating with other computing nodes via an interconnecting fabric 324. Each computing node may allocate a portion or partition of its respective local cache 314 to a virtual shared "global" cache 326 that can be accessed by other computing nodes, e.g. via DMA (direct memory access) or RDMA (remote direct memory access).

Production devices 124, 126 are logical volumes that are created to enable the primary storage array 106 to provide storage services to the component programs. Without limitation, the production devices may be referred to as production volumes, production LUNs or host LUNs, where LUN (Logical Unit Number) is a number used to identify the logical storage volume in accordance with the SCSI (Small Computer System Interface) protocol. The production devices are logical storage devices that represent abstraction layers between the managed drives 321, virtualized managed drives 128, 130 and the component programs. From the perspective of the component programs, each production device is a single data storage device having a set of contiguous fixed-size LBAs (logical block addresses) on which data used by the component program resides. However, the data used by the component programs is actually maintained by the computing nodes $206_1$-$206_4$ at non-contiguous addresses on various different managed drives 321 and virtualized managed drives 128, 130.

In order to service IOs from the component programs the primary storage array 106 maintains metadata 355 that indicates, among various things, mappings between production device storage space and the locations of extents of data on the managed drives 321 and virtualized managed drives 128, 130. In response to an IO 350 corresponding to a read request from one of the component applications the primary storage array uses the metadata 355 to locate the requested data, e.g. in the shared cache 326, managed drives 321 and virtualized managed drives 128, 130. If the requested data is not in the shared cache then it is temporarily copied into the shared cache from the managed drives or virtualized managed drives and sent to the component program via one of the computing nodes. In response to an IO 350 corresponding to a write request the storage array creates new metadata that maps the production device address where a location to which the data is written on the managed drives and virtualized managed drives. The shared cache 326 may enable the production device to be reachable via all of the computing nodes and paths, although the storage array can be configured to limit use of certain paths to certain production devices.

In order to enable the protection orchestrator 156 (FIG. 1) to manage generation of snaps 142, 144 consistently along with the other component snaps a shim program 360 is installed on the primary storage array 106. The shim program translates commands, requests, acknowledgements and replies between a first protocol that is used by the protection orchestrator and a second protocol that is used by the primary storage array. For example, the shim 360 translates a command from the protection orchestrator into a command to the computing nodes which requests creation of snaps 142, 144.

Figure 4:
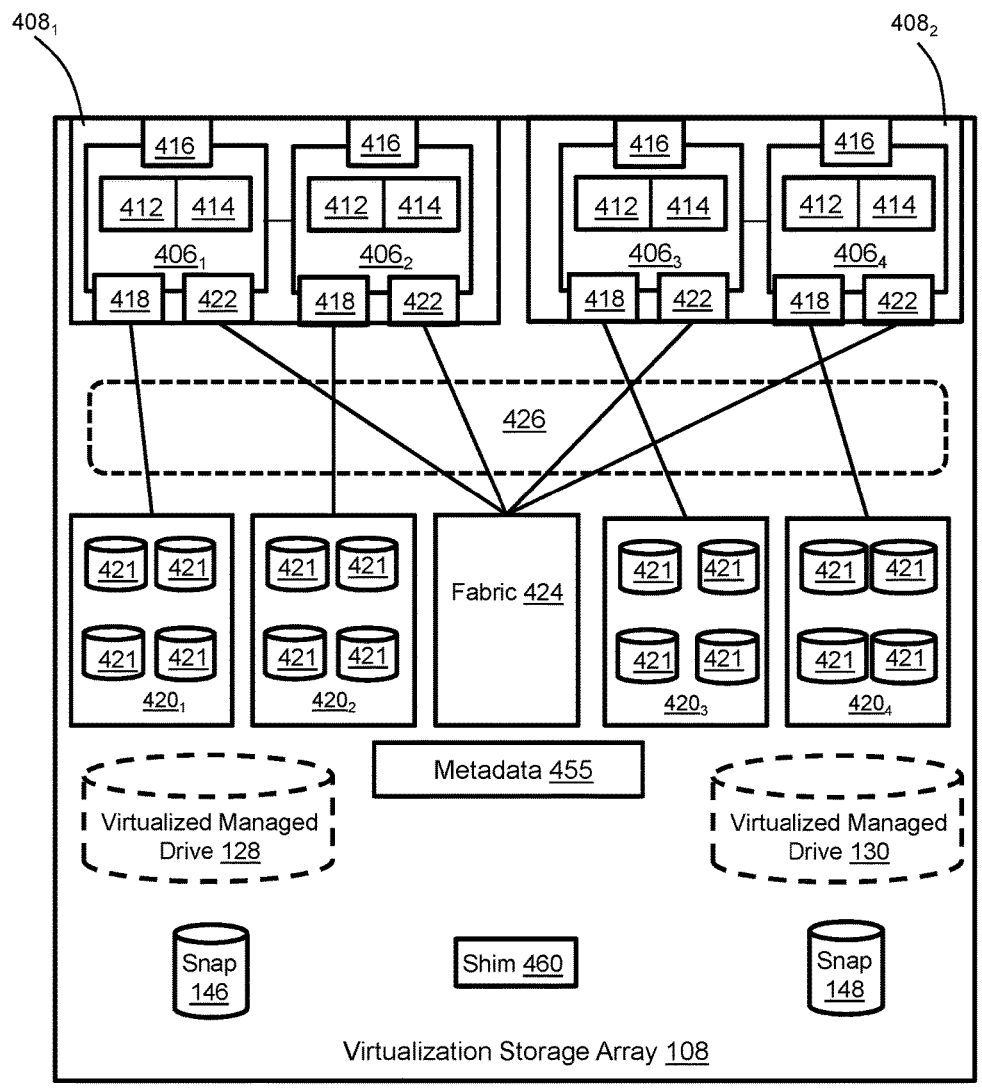
FIG. 4 illustrates the virtualized storage array in greater detail.

FIG. 4 illustrates the virtualized storage array 108 in greater detail. The virtualized storage array may be a conventional storage array with computing nodes $406_1$-$406_4$, storage engines $408_1$, $408_2$, tangible multi-core processors 412, local cache 414, FEs 416, BEs 418, fabric 424, shared cache 426, managed drives 421 and other features such as metadata 455 and storage bays $420_1$-$420_4$. The virtualized storage array maintains the virtualized managed drives 128, 130. The virtualized managed drives are an abstraction layer between the primary storage array and the managed drives 421 of the virtualized storage array. In other words, each virtualized managed drive may appear as a single logical volume of storage with contiguous addresses to the primary storage array, but the corresponding addresses are non-contiguous and may be distributed on multiple managed drives 421.

In order to enable the protection orchestrator 156 (FIG. 1) to manage generation of snaps 146, 148 consistently along with the other component snaps a shim program 460 is installed on the virtualized storage array 106. The shim program translates commands, requests, acknowledgements and replies between a first protocol that is used by the protection orchestrator and a second protocol that is used by the virtualized storage array. For example, the shim 460 translates a command from the protection orchestrator into a command to the computing nodes which requests creation of snaps 146, 148.

Figure 5:
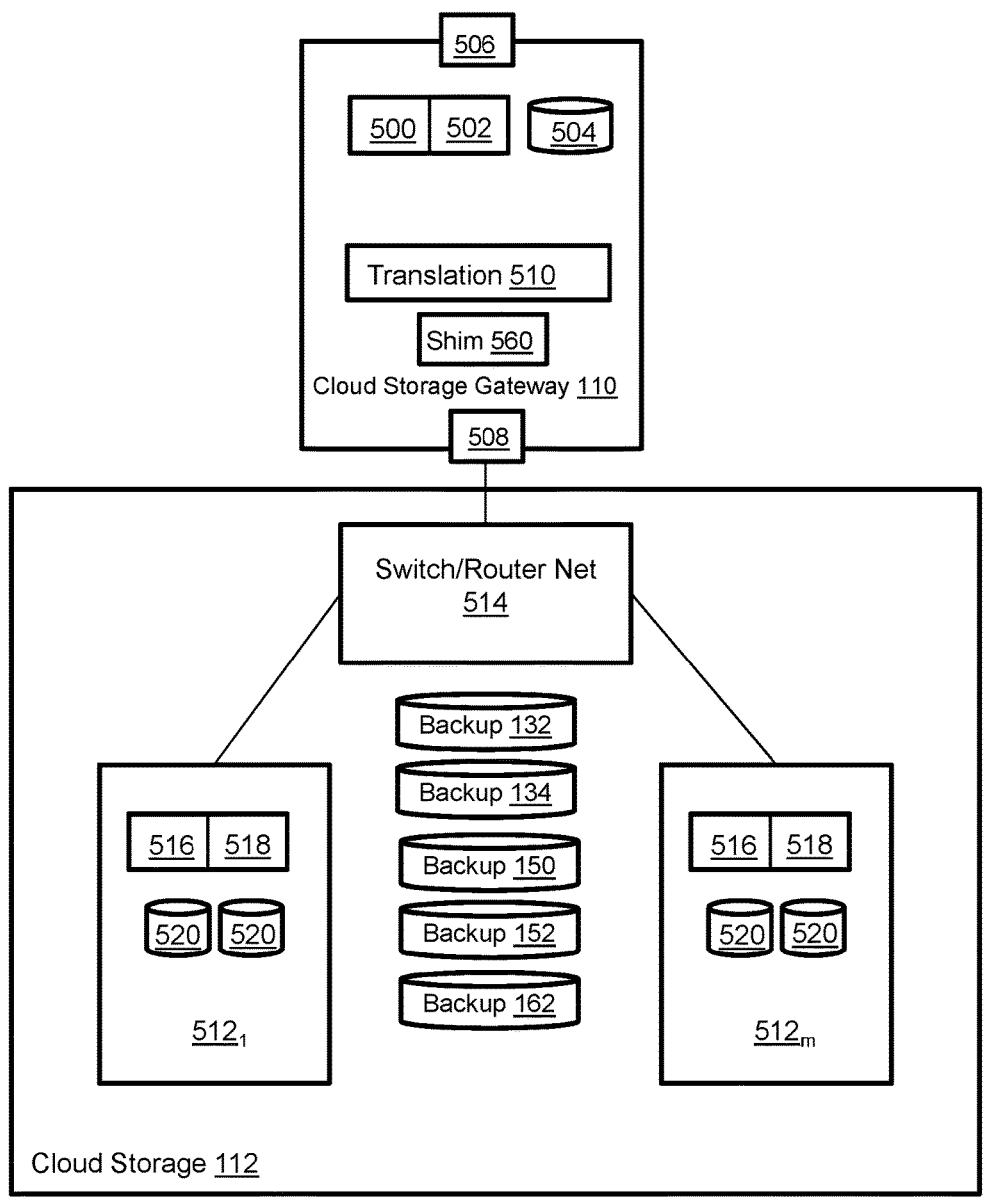
FIG. 5 illustrates the cloud storage gateway and cloud storage in greater detail.

FIG. 5 illustrates the cloud storage gateway 110 and cloud storage 112 in greater detail. The cloud storage gateway may be a tangible server computer that includes a tangible processor 500, volatile memory 502, and persistent storage 504. A network interface 506 is used for communication with the host computers and the primary storage array. A cloud interface 508 is used for communication with cloud storage 112. A translation program 510 translates between the protocols and APIs implemented by the host computers and the primary storage array, e.g. without limitation SCSI, and the protocols and APIs implemented by cloud storage, e.g. without limitation SOAP, REST and proprietary Web-based APIs that are specific to the cloud storage service provider. The memory 502 and storage 504 components are used to buffer data that is moved between cloud storage 112 and other nodes. In order to retrieve data, e.g. in response to an IO from a host computer, the cloud gateway obtains the data from cloud storage and then provides the data to the host computer.

Cloud storage 112 includes a plurality of storage servers $512_1$-$512_m$ that are interconnected by a switch/router network 514. Each storage server may include a processor 516, memory 518 and relatively low performance HDDs 520. Both cost and performance per unit of storage capacity may be low in comparison with the storage arrays. Backup copy 132 of production device 124 (FIG. 1), backup copy 134 of production device 126 (FIG. 1), and repository 136 are maintained on the HDDs 520.

In order to enable the protection orchestrator 156 (FIG. 1) to manage generation of temporally consistent backups 132, 134, 150, 152, 162 a shim program 560 is installed on the cloud storage gateway 110. The shim program translates commands, requests, acknowledgements and replies between a first protocol that is used by the protection orchestrator and a second protocol that is used by the cloud storage gateway. The cloud storage gateway translation program 510 translates the commands, requests, acknowledgements and replies between the second protocol and a third protocol and API implemented by cloud storage. For example, the shim 560 translates a command from the protection orchestrator into a command to cloud storage which requests creation of backups 132, 134, 150, 152, 162.

Referring again to FIG. 1, the version control repository includes a shim 164 that enables the protection orchestrator 156 to manage generation of snap 154 consistently along with the other component snaps. The shim program translates commands, requests, acknowledgements and replies between a first protocol that is used by the protection orchestrator and a second protocol that is used by the version control repository. For example, the shim 164 translates a command from the protection orchestrator into a command to the version control repository which requests creation of snap 154.

Figure 6:
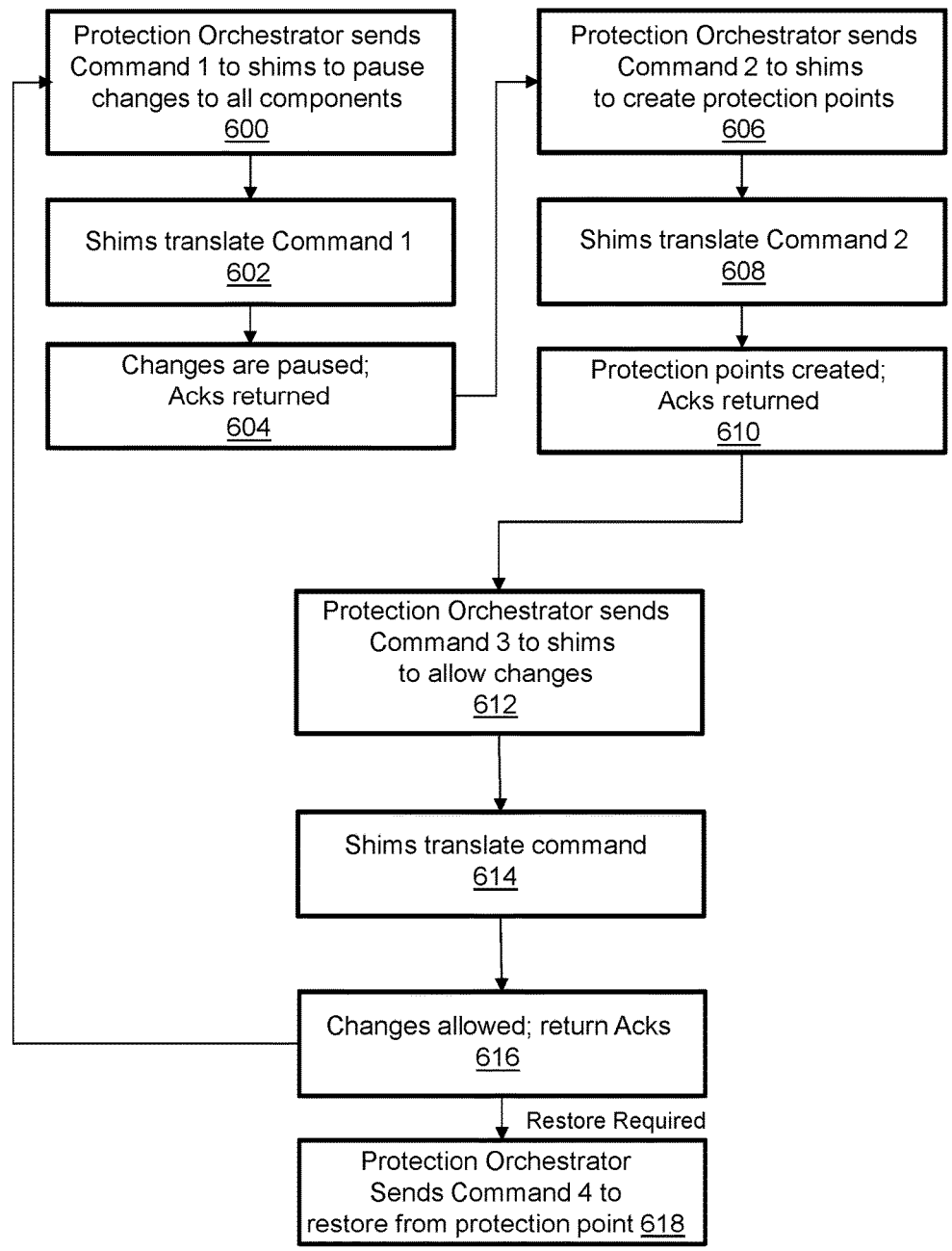
FIG. 6 illustrates a technique for generating consistent protection points for a multi-span business application.

FIG. 6 illustrates a technique for generating temporally consistent protection points for a multi-span business application. As indicated in block 600 the protection orchestrator sends Command 1 to all shims to pause changes to all components of the multi-span business application, e.g., data, programs, state. The shims translate Command 1 into protocol commands that are supported by the equipment and environment with which the respective shim is associated as indicated in block 602. The changes are paused and acknowledgments returned to the protection orchestrator as indicated in block 604. As indicated in block 606 the protection orchestrator sends Command 2 to all shims to prompt creation of protection points, e.g. snaps, clones, backups. The shims translate Command 2 as indicated in block 608. The protection points are created and acknowledgments returned to the protection orchestrator as indicated in block 610. As indicated in block 612 the protection orchestrator sends Command 3 to all shims to allow changes to all components. The shims translate Command 3 as indicated in block 614. Changes are allowed and acknowledgments returned to the protection orchestrator as indicated in block 616. The set of component protection points constitutes a consistent protection point for the multi-span business application. Flow returns to block 600 after some period of time or upon some condition to create another protection point for the multi-span business application. When restoration is required the protection orchestrator sends Command 4 to all shims to restore from a designated protection point as indicated in block 618.

The identity of each component protection point may be recorded, e.g., based on a name, date/time stamp, and/or a checksum of the content of the component protection point. The shims may, in response to Command 2, determine whether any changes have occurred since creation of a previous protection point. If changes have not occurred then creation of a new protection point at the component level may be deemed unnecessary because the previous protection point can be used at the business application level.

Specific examples have been presented in order to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
  a storage array comprising:
    a plurality of interconnected computing nodes, each of the computing nodes comprising at least one processor and non-transitory volatile memory;
    a plurality of groups of non-volatile data storage drives, each group of data storage drives connected with one of the computing nodes;
  a plurality of host computers, each host computer running at least one component program of a plurality of component programs that comprise a multi-span business application, component program data being stored on the storage array; and
  a protection orchestrator comprising instructions stored on non-transitory computer-readable memory that:
    causes changes to the component programs and the data to pause;
    causes creation of temporally consistent component protection points for the component programs and the data; and
    causes changes to the component programs and the data to un-pause after creating the temporally consistent component protection points.

2. The apparatus of claim 1 comprising a first shim program running on a first one of the host computers, the first shim program translating a first command to create a component protection point into a first protocol message that is supported by the first host computer.

3. The apparatus of claim 2 comprising a second shim program running on a second one of the host computers, the second shim program translating the first command into a second protocol message that is supported by the second host computer, the first protocol message being different than the first protocol message.

4. The apparatus of claim 3 comprising a third shim program running on a storage array, the third shim program translating the first command into a third protocol message that is supported by the storage array, the first, second and third protocol messages being different from each other.

5. The apparatus of claim 4 comprising a fourth shim program running on a version control repository, the fourth shim program translating the first command into a fourth protocol message that is supported by the version control repository, the first, second, third and fourth protocol messages being different from each other.

6. The apparatus of claim 1 wherein each of the component protection points is a snap.

7. The apparatus of claim 1 wherein each of the component protection points is a clone.

8. The apparatus of claim 1 wherein each of the component protection points is a backup.

9. The apparatus of claim 1 wherein each of the component protection points is an incremental backup.

10. The apparatus of claim 1 comprising a data replication appliance on which the protection orchestrator runs.

11. A method comprising:
  in a network comprising:
    a storage array comprising:

a plurality of interconnected computing nodes, each of the computing nodes comprising at least one processor and non-transitory volatile memory;

a plurality of groups of non-volatile data storage drives, each group of data storage drives connected with one of the computing nodes; and a plurality of host computers, each host computer running at least one component program of a plurality of component programs that comprise a multi-span business application, component program data being stored on the storage array;

pausing changes to the component programs and the data;

creating temporally consistent component protection points for the component programs and the data; and un-pausing changes to the component programs and the data after creating the temporally consistent component protection points.

12. The method of claim 11 comprising running a first shim program on a first one of the host computers, the first shim program translating a first command to create a component protection point into a first protocol message that is supported by the first host computer.

13. The method of claim 12 comprising running a second shim program on a second one of the host computers, the second shim program translating the first command into a second protocol message that is supported by the second host computer, the first protocol message being different than the first protocol message.

14. The method of claim 13 comprising running a third shim program on a storage array, the third shim program translating the first command into a third protocol message that is supported by the storage array, the first, second and third protocol messages being different from each other.

15. The method of claim 14 comprising running a fourth shim program on a version control repository, the fourth shim program translating the first command into a fourth protocol message that is supported by the version control repository, the first, second, third and fourth protocol messages being different from each other.

16. The method of claim 11 wherein creating temporally consistent component protection points comprises creating snaps.

17. The method of claim 11 wherein creating temporally consistent component protection points comprises creating clones.

18. The method of claim 11 wherein creating temporally consistent component protection points comprises creating backups.

19. The method of claim 11 wherein creating temporally consistent component protection points comprises creating incremental backups.

20. The method of claim 15 comprising sending the command from a protection orchestrator running on a data replication appliance.

* * * * *